United States Patent
Staiger

(10) Patent No.: US 8,086,771 B2
(45) Date of Patent: Dec. 27, 2011

(54) TCET EXPANDER

(75) Inventor: Dieter E. Staiger, Well im Schonbuch (DE)

(73) Assignee: International Business Machines Corporation, Armonk, NY (US)

( * ) Notice: Subject to any disclaimer, the term of this patent is extended or adjusted under 35 U.S.C. 154(b) by 1686 days.

(21) Appl. No.: 10/539,111

(22) PCT Filed: Oct. 31, 2003

(86) PCT No.: PCT/EP03/12167
§ 371 (c)(1),
(2), (4) Date: Dec. 15, 2005

(87) PCT Pub. No.: WO2004/057431
PCT Pub. Date: Jul. 8, 2004

(65) Prior Publication Data
US 2006/0161269 A1  Jul. 20, 2006

(30) Foreign Application Priority Data
Dec. 19, 2002  (EP) .................................. 02102830

(51) Int. Cl.
*G06F 13/12* (2006.01)
*G06F 13/38* (2006.01)
*G06F 3/00* (2006.01)
*G06F 5/00* (2006.01)
*G05B 19/18* (2006.01)
*G05B 11/01* (2006.01)

(52) U.S. Cl. .................. 710/62; 710/38; 700/2; 700/19; 700/20

(58) Field of Classification Search .................. None
See application file for complete search history.

(56) References Cited

U.S. PATENT DOCUMENTS

| 4,942,571 | A |   | 7/1990 | Moller et al. ................. 370/85.1 |
| 5,150,466 | A | * | 9/1992 | Barlow et al. ................. 710/122 |
| 5,311,197 | A |   | 5/1994 | Sorden et al. ................. 342/457 |
| 5,434,998 | A | * | 7/1995 | Akai et al. ....................... 714/11 |

(Continued)

FOREIGN PATENT DOCUMENTS

DE  19832531  2/2000

(Continued)

OTHER PUBLICATIONS

Zhao, C. S. et al. "A Multiprocessor-Based "Universal" Interface for Multisenor-Based Robotic System", Communications, computers and Signal Processing, 1993.IEEE Pacific Rim Conference on Victoria, BC, Canada 19-21. vol. 2, pp. 524-527, May 1993.

*Primary Examiner* — Henry Tsai
*Assistant Examiner* — Kris Rhu
(74) *Attorney, Agent, or Firm* — Steven L. Nichols; Van Cott, Bagley, Cornwall & McCarthy P.C.

(57) ABSTRACT

The present invention relates to the field of embedded processing systems and electronic control units (ECUs) and to autonomic embedded computing solutions. The present invention proposes to remove or extract the application-specific support functions and respective I/O subsystems from the main processors or controllers of the system, to include said extracted circuits into a respective number of ASIC chips or the like, and to connect them preferably via a supervising General Controller Unit (12) to a plurality of standard and low-price processors (40), which have the task to supply the ASIC and the multiple functions thereof with enough computing power.

17 Claims, 3 Drawing Sheets

INVENTIONAL

U.S. PATENT DOCUMENTS

| | | | |
|---|---|---|---|
| 5,475,269 A * | 12/1995 | Takeuchi | 307/10.1 |
| 5,504,482 A * | 4/1996 | Schreder | 340/995.13 |
| 6,202,110 B1 * | 3/2001 | Coteus et al. | 710/301 |
| 6,222,484 B1 * | 4/2001 | Seiple et al. | 342/357.09 |
| 6,408,407 B1 * | 6/2002 | Sadler | 714/57 |
| 6,579,231 B1 * | 6/2003 | Phipps | 600/300 |
| 2001/0016789 A1 * | 8/2001 | Staiger | 701/1 |
| 2004/0138790 A1 * | 7/2004 | Kapolka et al. | 701/29 |
| 2004/0205386 A1 * | 10/2004 | Staiger | 714/6 |
| 2004/0225778 A1 * | 11/2004 | Borkar et al. | 710/200 |

FOREIGN PATENT DOCUMENTS

| | | |
|---|---|---|
| EP | 1136325 | 9/2001 |
| JP | 63-127303 | 5/1988 |
| JP | 04-150701 | 5/1992 |
| JP | 08-202409 | 8/1996 |
| JP | 2002-542743 T | 12/2002 |
| WO | WO0064199 A2 | 10/2000 |

* cited by examiner

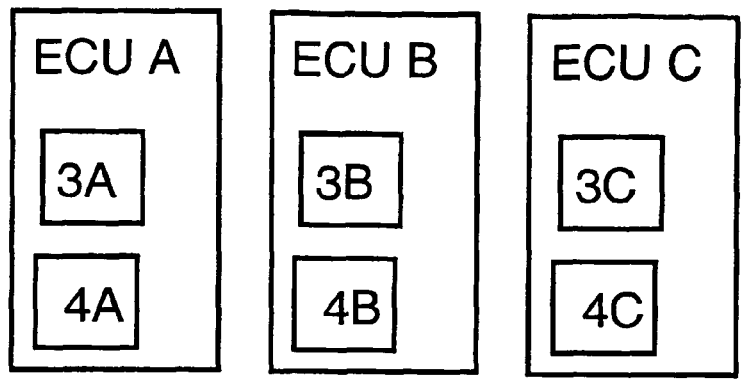
FIG. 1 PRIOR ART
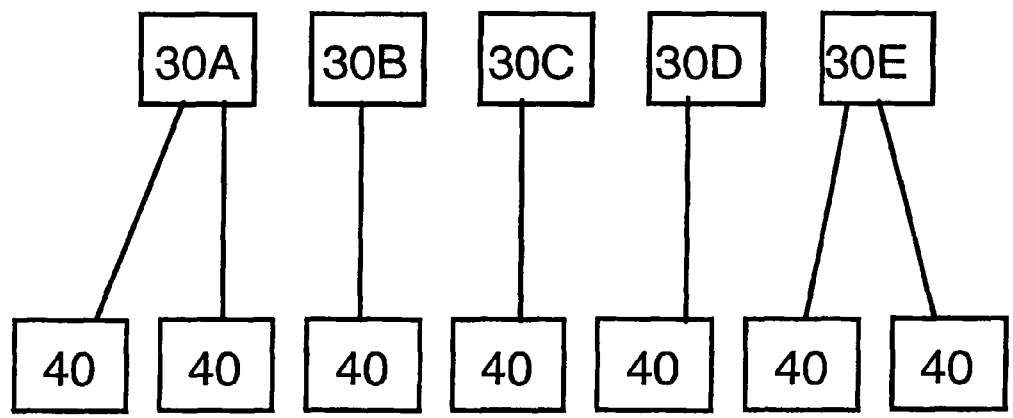
FIG. 2 INVENTIONAL
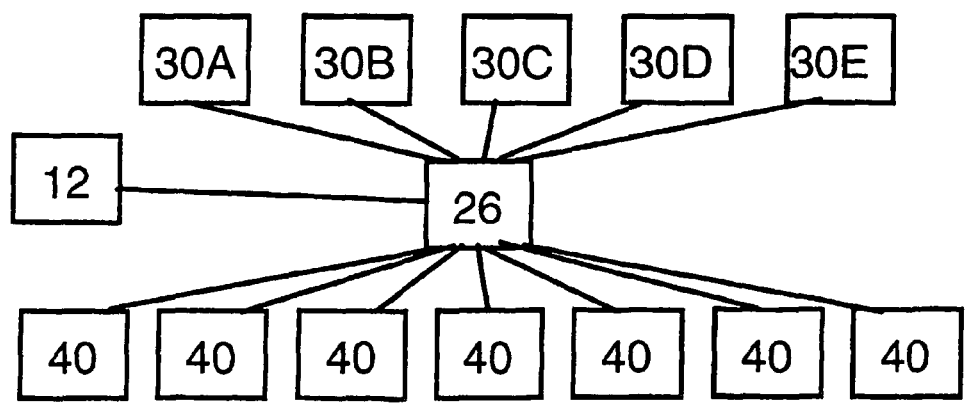
FIG. 3 INVENTIONAL

TCET EXPANDER

1. BACKGROUND OF THE INVENTION

1.1. Field of the Invention

The present invention relates to the field of embedded processing systems and electronic control units (ECUs) and to autonomic embedded computing solutions in particular for telematic applications implemented in vehicles on road.

1.2. Description and Disadvantages of Prior Art

The present invention may be applied in a variety of technical environments including industrial control units, e.g. machinery tool control, manufacturing-line control units, automotive ECUs, multimedia units, telematic units, home appliance electronic control units, commercial and industrial diagnostics equipment tools, as well as in autonomic-embedded-computing solutions for vehicles on road, track, in the air, on/under water for security relevant systems and for safety relevant systems.

In the field of embedded processing systems and ECUs generally, a variety of functions are performed in a computer-assisted way. Very often, this means to apply a dedicated single- or multiprocessor unit to achieve one particular function. This is very often accompanied by applying quite specialised expensive components which are produced very specifically and in small series just to perform a single application function. This is repeated for a plurality of different application functions, which results in enormous aggregation of high cost ECUs, which work side by side, sometimes connected via a common bus system.

The same is true for the before-mentioned embedded-computing solutions for vehicles for example on road. As this is a particular focus of the present invention, prior art will be discussed in closer relationship thereto.

In automotive applications the security requirements are basically quite high in order to avoid breakdown of components as this may result in risking critical situations. Thus, quite expensive, highly reliable components and subsystems are often used redundantly which share a common bus system, for example a CAN-bus. Typically, a prior art embedded system may be sketched out as follows: an embedded processing system covering a plurality of technical applications, the operative functions of which are performed with a respective plurality of application-specific Electronic Control Units (ECU), whereby an ECU comprises a micro-controller and/or one or more processors, and specific input/output (I/O) subsystems.

This situation is schematically shown in FIG. 1. Three ECUs A, B, C are depicted, of which each ECU performs an own application function. ECU A may be considered to be dedicated for heating and cooling the car, ECU B for controlling a built-in mobile phone and ECU C for controlling open and closing of the windows. As one can see, each ECU comprises a specialised application-specific input/output subsystem 3 and one or more processors or micro-controllers 4. They differ from A, B and C very distinctly because the I/O subsystems are specific for controlling temperature, controlling the mobile phone and controlling the opening and closing of windows.

In the automotive sector such embedded systems are increasingly used. In many cars, the value of them is in the range of 20 to 30% of the total car value. Under the general constraint to provide improvements to the purchaser of a car giving more safety, security or luxury the car manufacturers must basically build in more redundancy in order to avoid that an eventual breakdown of a part of a ECU causes problems. Increased redundancy of electronic circuits, however, results in an increase of costs because expensive systems are used, which must be duplicated on system- and subsystem level. Further, a general cost-increasing problem is that a car manufacturer buys one ECU from a first supplier, and the next ECU from a different supplier and is thus very dependent of specific suppliers and on their proprietary solutions, systems, subsystems and components.

One solution to this would be the unrealistic approach to demand from a ECU-supplier also to fabricate ECUs for applications which are not inside his competence. Of course, this way is not feasible.

1.3. Objectives of the Invention

It is thus an objective of the present invention to provide improved embedded processing systems which have an increased level of security, performance, while the costs are not increased, but more or less decreased.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to its broadest aspect an embedded system known from prior art is modified significantly. The inventive system is characterized by having a plurality of extracted interfaces—hereafter called interface expander controllers (digital I/O generation and capture, analog I/O, bus-systems controllers) comprising each a respective one of said application-specific I/O subsystems and one or more standard processor units having only a standard I/O-interface connecting to an extracted interface chip.

Thus, the present invention proposes to remove or extract the application-specific support functions and respective I/O subsystems from the main processors or controllers of the system, to include said extracted circuits into a single ASIC chip or respective number of ASIC chips or the like, and to connect them preferably via a supervising General Controller Unit (12) to a plurality of standard and low-price processors (40), which have the task to supply the ASIC and the multiple functions thereof with enough computing power. By that, a remarkably cheaper embedded system is obtained due to the fact that the computing power is provided by a plurality of cheap, standard processors.

Further, the system may further have mapping means and a General Controller Unit operatively coupled thereto for dynamically switching a (low-price standard) processor 40, or a plurality of them to a selected extracted interface chip under consideration of processor timing requirements. This enables for more flexibility and better efficiency of processors due to dynamic switching, which is advantageous for instance for a situation in which a processor has a breakdown period.

Further, according to a further aspect of the present invention, the before-mentioned approach is implemented in a 3-layer architecture having:

a primary layer comprising basic configuration layout data and standard interface means for connecting to said plurality of standard processors specifying static interface settings for said plurality of standard processor units, and a secondary layer comprising an "autonomic-state" switchboard matrix means, an emergency switchboard matrix means and a port interface means connecting to said plurality of application-specific I/O subsystems. In addition to the above mentioned basic concept this enables for a clearly structured architecture of the total embedded system, and also provides for a reliable emergency processing in case one of said processors has a break down.

When an additional autonomous controller implements a monitoring function e.g., an individually programmable Watchdog, monitoring the operational status of said plurality of standard processing units, and said monitoring function is operatively coupled to said General Controller Unit (12) and the mapping means, then the system reliability and safety is further enhanced, as the monitoring function is not dependent of the rest of the (standard) processors.

When, further, a database is provided storing instructions on how to handle specific breakdown cases, i.e., collecting a plurality of different error state conditions of the plurality of subsystems and processors mapped thereto, then a predetermined, free configurable emergency task distribution is established saying which processor supplies which application. Thus, the application specific chips ASICs can be prioritized, and further, a priority rule can be made dependent and dynamically varying in dependence of the current operational state of the car. Thus, operation states e.g., driving with a speed of 150 km/h may be set in contrast to an operational state, of speed=0 km/h, or a closed, parking car, without any person sitting inside.

The extracted application-specific logic means may be advantageously implemented as in ASIC form.

Further, a further, separate emergency controller, e.g., a separate ASIC chip or ASIC chip added to the single or multiple I/O ASIC chip solution, may be provided continuously storing the current GPS coordinates after reading it from an interface to a built-in navigation system. Said emergency controller is dedicated to send an emergency signal including said coordinates and possibly further individually programmable text information—for example specifying the blood type (A, B, AB including Rhesus factor) of the driver and accompanying persons, in form of an SMS—message (Short message Service), in case one or more external sensor devices detect an emergency case in form of an accident. In this variation the power supply for the emergency controller preferably includes a condenser device instead of or in conjunction with a battery, in order to guarantee that the message may be sent out even in a case in which the car's main power supply does not work anymore.

Finally, the inventional concept is an improvement of elevated value for the particular IBM "TCET" architecture, a computer system architecture for distributed systems using a loosely coupled multiprocessing.

3. BRIEF DESCRIPTION OF THE DRAWINGS

The present invention is illustrated by way of example and is not limited by the shape of the figures of the drawings in which:

FIG. 1 is a schematic block diagram representation illustrating the basic structural components of an embedded system in prior art;

FIGS. 2,3 is a schematic block diagram representation illustrating the basic structural components of an embedded system according to a basic (FIG. 2) and preferred Aspect (FIG. 3) of the present invention;

4. DETAILED DESCRIPTION OF THE PREFERRED EMBODIMENT

Figure 4:
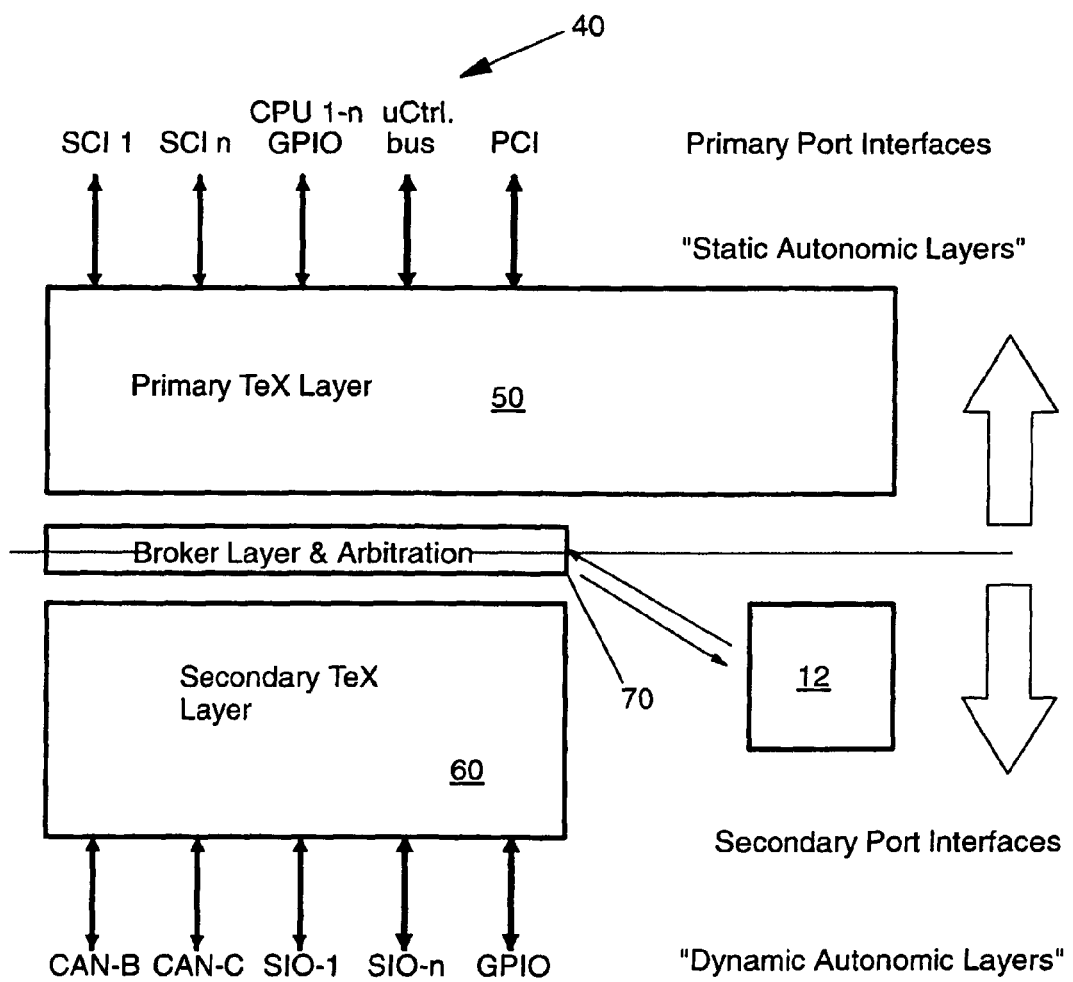
FIG. 4 is a schematic block diagram representation illustrating the basic structural components of an embedded system according to the preferred layer concept of the present invention.

With general reference to the figures and with special reference now to FIG. 2 the basic idea of the present invention is illustrated in a quite abstract manner in order to increase clarity. The abstract core of the present invention comprises the idea of extracting the application-specific I/O subsystem from the rest of the ECU, consisting essentially of the processor part. Thus, in an illustrative example, in which an embedded system comprises a plurality of five (A to E) ECUs, for each ECU a specialised, application-specific interface chip 30A, 30B, . . . 30E is provided which are basically all connected to standard-like, unspecialised, possibly simple-structured and cheap processors 40.

Thus, each of the distinct ECUs A, B, C have specific I/O subsystems and are preferably operated with the same type of processor. Of course, a larger number of processors can be used without increasing the price of the total system, as such processors 40 may be produced in large series. Each CPU 40 preferably comprises standard input/output ports, and standard register and interrupt ports. Each of said specific I/O subsystems, however, is further produced in a smaller series which basically does not contribute to cheaper prices, due to the fact, however that the extracted, application-specific I/O subsystems require significantly reduced silicon chip area, as, for example, a CAN-controller needs about 3000 gates only, a serial I/O for connecting to a modern device needs about 2000 gates only. Thus, a considerable decrease of chip area can be achieved for the application-specific subsystems 30A, . . . 30E.

Even when adding a CPU to such inventional ECU, in order to increase security by redundancy this does not increase the overall costs significantly. Increased redundancy ECUs are depicted at the left and right margin in FIG. 2. The association between an application-specific extracted circuit 30 and a standard processor 40 is fixed in this primary aspect.

A further advantageous aspect of the present invention is illustrated in FIG. 3:

A general controller unit 12 is provided operatively coupled with a mapping means 26 in order to be able to obtain a possibly varying association between each of said application-specific subsystems 30A, . . . 30E and the standard processors 40. For example, in case of one of said processors 40 has a breakdown and is not active anymore, the controller unit 12 may control the mapping means electronic circuit (26) to disconnect the breakdown processor from the respective I/o subsystem and to connect the latter one to a different CPU which is going fine.

This dynamic mapping between standard processors and a respective-specific I/O subsystem will be further enhanced and described in more detail amongst other advantageous inventional features in the following figures:

In FIG. 4 a preferred embodiment of the present invention is described with varying aspects from figure to figure, which might be used in the telematics field in order to improve the plurality of embedded systems in a car. The general aspect thereof is basically coincident with the approach given in FIG. 3. It should be noted, however, that in FIGS. 4 to 5 the standard processor units are depicted at a respective top-portion in the figures, whereas in FIGS. 1 to 3 the processors are depicted in the respective bottom portion.

The preferred embodiment discloses a three-layer structure, a primary layer 50 basically comprising the primary port interfaces to connect to the above-mentioned standard processors 1 to n, denoted with reference sign 40, above, connecting to further general purpose input/output circuitry, to a micro-controller bus and for example to a PCI-bus-system. The primary layer 50 is basically intended to comprise static configuration data for the connected processor systems and subsystems. The general purpose I/O systems are utilized as a generic fill-in and complementing I/O systems to imitate standard micro-Controller busses and respective memory interfaces.

Further, a secondary layer 60 is provided according to this embodiment, which basically comprises dynamically reconfigurable parameter settings for the standard, application-specific input/output subsystems as is for example CAN-B, CAN-C, or standard I/O subsystems SIO-1 to SIO-n, or a general purpose I/O subsystem.

Further, a broker and arbitration layer 70 is provided cooperating with a General Controller 12, which basically is corresponding to component 26 and 12 in FIG. 3, respectively. Thus, a mapping as illustrated in FIG. 3 may also take place in the system depicted in FIG. 4.

Figure 5:
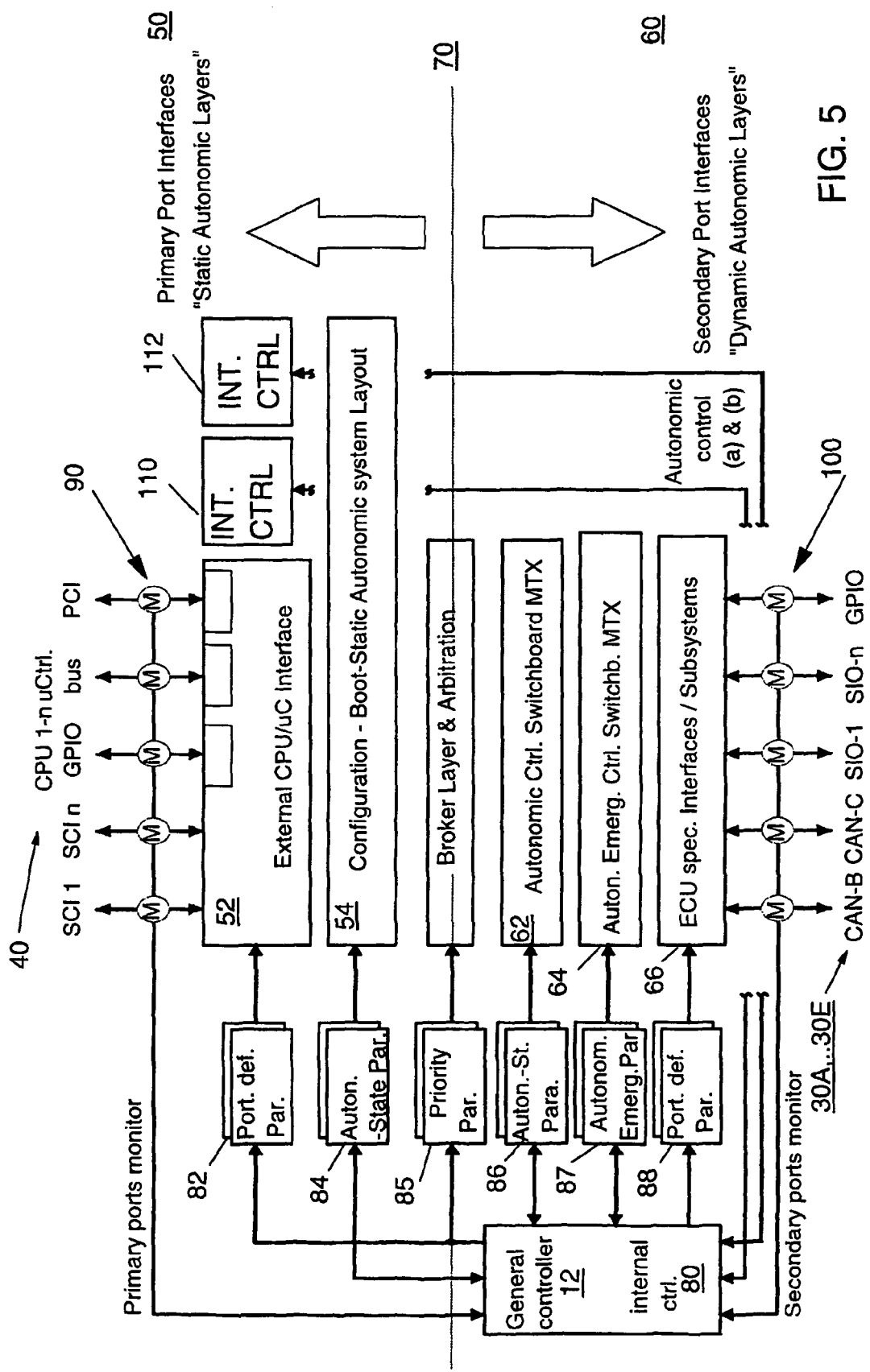
FIG. 5 is a schematic block diagram representation illustrating the basic structural components of an embedded system according to FIG. 4 showing some more details.

With further reference to FIG. 5 further preferred features of the basic embodiment depicted in FIG. 4 are further illustrated in more detail. Again, the primary layer 50 is depicted in the top-portion of the figure. In particular, the general controller unit 12 is equipped with an additional controller 80 implementing a monitoring function, for example in form of individually programmed watchdog functions 90, 100 for both, the primary port interfaces and the secondary port interfaces 100. In FIG. 5 the monitored points 90, 100 are depicted with an encircled "M" ("Monitor").

All logic detailed in FIG. 5 or FIG. 4 may be advantageously provided in form of a programmable ASIC, or a static ASIC.

The primary layer 50 further comprises in particular a logic 52, which implements the external CPU or micro-controller interface. It has a set of registers 82 accessible by controller unit 12, which stores all necessary port definition parameters.

Further, the basic system layout is stored in a configuration section 54, which stores the so-called "static system parameters" for all processors connected to the ASIC. Those autonomic state parameters comprise any static, ie, "normal case" boot or re-boot information for the embedded system and are stored in a set of registers 84. Further, the broker layer and arbitration logic 70 stores some priority parameter 85 in respective input registers. Those priority parameters define which of the subsystems of the secondary layer 60 are to be supplied with CPU processing power according to a given priority rule, which prefers the most important subsystems first. Thus, in case one or more of said processor units fail, such priority rules define an emergency operation, which enables the most important application functions to continue.

Further, said secondary layer 60 comprises preferably an autonomic control switchboard matrix 62 having associated a set of autonomic state parameter registers 86, further an autonomic emergency control switchboard 64, having an autonomic emergency parameter set 87, which provides for emergency boot or re-boot capability, and a physical interface logic 66 having respective input registers 88 which provides for the physical access to the actual application-specific I/O systems (CAN-bus, mobile phone and other I/O equipment in the above-mentioned example).

All of the above-mentioned parameter registers 82, 84, 85, 86, 87, and 88 are accessible by said general controller unit 12. Preferably, said controller unit 12 comprises an own processor 80 acting independently of the plurality of processors 40 mentioned above. Further, according to a preferred aspect of the present invention the general purpose controller 12 may access a built-in "database", which stores instructions on how to handle specific breakdown cases or error state cases associated with either of said standard processors. For example, when some of the watchdogs monitoring the processors report an error status of the associated processor, the general controller unit will perform a lookup in the error case database and selects select the pre-programmed instruction on how to handle this specific error case. In practice, when for example the processor associated with closing and opening the windows has a breakdown, then the general controller unit 12 may decide due to said lookup that the processor associated basically with managing audio/video subsystems may be exceptionally used for closing the windows. This dynamically performed switching from one processor to the other processor is performed via the autonomic control switchboard matrix 62, which is basically a multiplexer controlled by unit 12. It should be understood that functions other than the above mentioned examples may also be controlled by the inventional feature of dynamic switching.

Further, preferably one or more internal controllers 110, 112 may be advantageously provided in order to provide processing power for major emergency cases in which a significant number of standard processors are in error state. These additional controllers are then occupied to reboot the system if required, with strongly modified emergency parameter sets, thus to perform a "reverse" boot or emergency boot process targeted to supply processing power only to the most important subsystems. This is again switched via said multiplexer unit 62 in co-operation with the general controller unit 12.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system—is able to carry out these methods.

Computer program means or computer program in the present context means any expression, in any language, code or notation, of a set of instructions intended to cause a system having an information processing capability to perform a particular function either directly or after either or both of the following:

a) conversion to another language, code or notation;
b) reproduction in a different material form.

The invention claimed is:
1. A circuit in an embedded processing system covering a number of technical applications, a number of operative functions of the number of technical applications being performed via a respective number of application-specific Electronic Control Units (ECU), the circuit comprising:
 a) a number of application specific interface chips for controlling respective application specific ECUs, each of the application specific interface chips comprising a number of application-specific support functions and I/O subsystems; and
 b) a number of processor units each having an I/O-interface operatively connecting to a respective one of the appli- cation specific interface chips and supplying that application specific interface chips with computing power,
wherein at least one of the processor units and a respective application specific interface chips are implemented on different chips.

2. The circuit according to claim 1, further comprising mapping means for mapping the I/O subsystems to the processor units, and a General Controller Unit operatively coupled to the mapping means and configured to dynamically switch at least one of the processor units into communication with a selected application specific interface chips based on processor timing requirements.

3. The circuit according to claim 2, further comprising:
a primary layer comprising basic configuration layout data and an interface means for connecting to the number of processor units; and
a secondary layer comprising a preprogrammed, autonomic state switching means, a preprogrammed emergency switching means, and a port interface means connected to at least one of the I/O subsystems.

4. The circuit according to claim 3, further comprising an additional controller operatively coupled to the General Controller Unit and configured to implement a monitoring function for monitoring the operational status of the processor units and the application specific interface chips.

5. The circuit according to claim 1, further comprising a database storing instructions on how to handle specific errors associated with the number of processor units.

6. The circuit according to claim 1, further comprising a number of emergency controllers for continuously storing current global positioning system (GPS) coordinates and configured to send an emergency signal including the coordinates in case a number of external sensor devices detect an emergency case.

7. An embedded system having an electronic circuit according to claim 1.

8. An Application-Specific Integrated Circuit (ASIC), comprising:
interface circuitry configured to communicate with a plurality of application-specific controller subsystems external to said ASIC;
interface circuitry configured to communicate with a plurality of general-purpose processors external to said ASIC; and
controller circuitry communicatively configured to couple each said application-specific controller subsystem to at least one corresponding said general-purpose processor such that said at least one corresponding general-purpose processor performs processing on behalf of that said application-specific controller subsystem.

9. The ASIC of claim 8, in which said controller circuitry is further configured to monitor at least one of said general-purpose processors or said application-specific controller subsystems for at least one anomaly.

10. The ASIC of claim 9, in which said controller circuitry further comprises a database storing instructions of actions to take in response to at least one specific said anomaly.

11. The ASIC of claim 10, said controller circuitry being further configured to dynamically alter said coupling of at least one application-specific controller subsystem to said at least one corresponding general-purpose processor in response to detecting a said anomaly.

12. The ASIC of claim 11, in which said anomaly comprises a breakdown in a said general-purpose processor.

13. The ASIC of claim 12, in which said controller circuitry is configured to dynamically couple a said application-specific controller subsystem that was previously coupled to said general-purpose processor experiencing said breakdown to a new said general-purpose processor.

14. The ASIC of claim 13, in which said ASIC stores instructions for prioritizing said application-specific controller subsystems.

15. The ASIC device of claim 13, in which said ASIC stores instructions to wirelessly transmit a current location of said ASIC device to a recipient.

16. The ASIC device of claim 15, further comprising transmitter circuitry for transmitting said current location of said ASIC device to said recipient.

17. The ASIC device of claim 16, in which said transmitter circuitry comprises a condenser device configured to power said transmitter circuitry if a main source of power for said ASIC device is lost.

* * * * *